Nov. 30, 1954 E. SILVERMAN 2,695,548

MIRROR AND CARRYING CASE SUPPORTING MEANS FOR TELEVISION SERVICING

Filed Jan. 30, 1953 3 Sheets-Sheet 1

INVENTOR.
EMANUEL SILVERMAN
BY
Sidney A. Ochs
ATTORNEY

INVENTOR.
EMANUEL SILVERMAN
BY
Sidney A. Ochs
ATTORNEY

INVENTOR.
EMANUEL SILVERMAN
BY
Sidney A. Ochs
ATTORNEY

United States Patent Office 2,695,548

Patented Nov. 30, 1954

2,695,548

MIRROR AND CARRYING CASE SUPPORTING MEANS FOR TELEVISION SERVICING

Emanuel Silverman, Detroit, Mich.

Application January 30, 1953, Serial No. 334,150

8 Claims. (Cl. 88—97)

This invention relates to improvements in television servicing aids and especially to a servicing mirror adjustable in a vertical plane and in a horizontal plane, that is to say, universally adjustable for aiding in the servicing of television receiving sets.

With the advent of television it has been increasingly necessary to provide adequate tools and equipment for aiding servicing men in the home or other servicing of television receiving sets.

In adjusting a television receiving set for example to obtain proper picture focus it is necessary for the service technician to obtain a full view of the television screen. Since most of the main controls on currently made sets are located at the rear of the set it becomes necessary to resort to a viewing mirror positioned in front of the set in order to obtain a view of the screen while standing behind or reaching behind a set to make adjustments.

The service technician has thus been confronted with the problem of finding a suitable mirror in the home or providing one himself and locating suitable props in the home with which to adjustably position and tilt the mirror to obtain a reasonably satisfactory view of the screen from behind the set. In many instances by reason of set location and/or lack of technique of the service person a satisfactory adjustment was almost impossible. This lack of a suitable service device has caused considerable waste of time in servicing a set and inconvenience to the owner in providing props. Moreover it has also resulted in broken mirrors during use and in carrying them between jobs.

An object of the present invention is to provide a simple portable and adequate television servicing mirror that will overcome the foregoing difficulties.

A particular object of my invention is to provide a television service mirror which is capable of adjustment in a horizontal plane and in a vertical plane, that is to say, universally adjustable, to meet the requirements of the service technician. Another particular object is to provide a television service mirror requiring no outside props for securing adjustability and the mounting for which may serve both as a stand and as a protective carrying case for the mirror.

A further object is to provide a combination television service mirror, support and stand which may be easily set up for use and the mirror quickly and easily adjusted both laterally and vertically and which support and stand may be conveniently converted to a compact carrying case enclosing and protecting the mirror from damage.

Another object is to provide a combination television service mirror and carrying case of the aforesaid character in which the service technician may conveniently carry the necessary equipment and tools for adjusting the controls of a television receiving set.

These and other objects of my invention will appear from the following description and from the drawings illustrating a preferred form of my invention and wherein.

Figure 1:
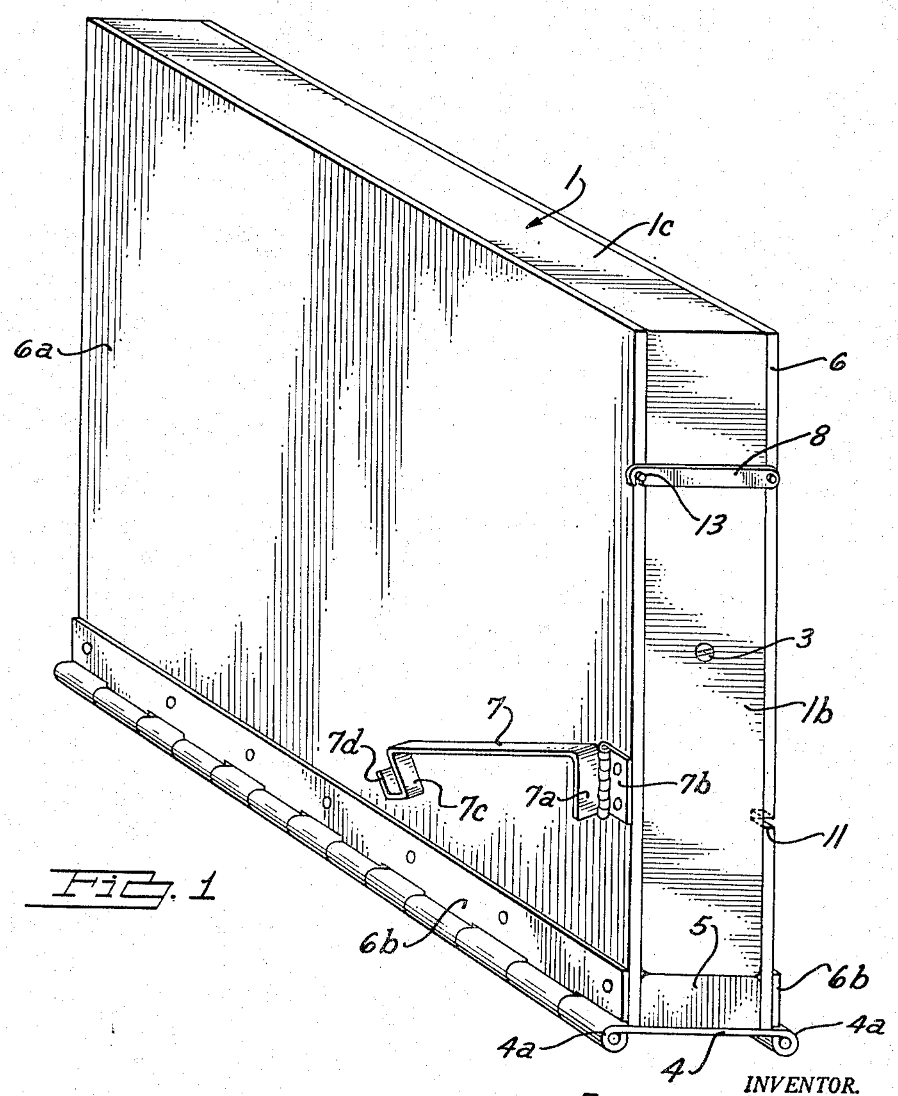
Figure 1 is an elevational view in perspective showing the television service device of my invention in closed condition ready for carrying.

Referring now to the drawings wherein like numerals have reference to similar parts of the structure, my television servicing device preferably comprises a mirror structure generally designated by the letter A providing mirror means 2, suitably connected to a base structure, generally designated by the letter B, for universal adjustment relative thereto, the latter preferably constituting a combination stand and protective casing means for the mirror means 2.

In addition to the mirror means 2, the mirror structure A preferably comprises a support 1 for the mirror means which may be in the form of a rectangular frame having vertical sides 1*a* and 1*b* and horizontal sides 1*c* and 1*d* and on which the mirror means 2 is suitably carried, journaled, or pivoted for turning movement, as by opposite coaxial set screws 3 preferably located centrally of the sides 1*a* and 1*b* respectively of the support 1.

By preference the mirror means 2 will include a mirror 14 and a suitable peripheral holder or frame 12 arranged to nest within the support 1 with sufficient clearance at top and bottom relative to the support 1 to permit tilting of the mirror means on the set screws 3 from its normal vertical position. These screws conventionally extend from the sides 1*a* and 1*b* respectively of the support 1 into the frame 12 to join these two together while permitting tilting of the frame and its mirror relative to the support.

The base B comprises by preference a central member 4 having opposite hinge portions 4*a* between or inside of which is a raised swivel portion 5 which carries the support frame 1. This swivel portion may desirably be an elongated bar or plate rigidly fastened to the member 4. The support 1 is preferably held in place by a connecting pin 10 which extends through the member 4 portion 5 and side 1*d* of the support 1 and permits the support 1 to pivot or turn laterally in a horizontal plane on the portion or plate 5. Hingedly connecting with the central member 4 of the base B are a pair of plate-like legs or leaves 6 and 6*a* the upper edge portions of which carry hinge portions 6*b* which connect through suitable pintle means with the hinge portions 4*a* of the member 4 such that the leaves 6 and 6*a* may be swung up and against the support frame 1 as seen in Figure 1 to form in effect with the member 4 a closed book or case for the mirror structure A, or may be swung down as in Figure 2, to form with the members 4 and 5 of the base structure B a trapezoidal-like stand for the mirror structure A.

Suitable means, for instance a tie bar or supporting arm 7 is preferably provided at one end of the leaves 6 and 6*a* in the upper quarter section at that end, for holding the leaves in open predetermined inclined relationship where they serve as legs of the base B. As seen in Figures 1 and 2 this arm 7 is of generally U-shape. It has one of its legs 7*a* hingedly connected and fastened to the leaf 6 by a hinge portion 7*b* such that it may, when free, be swung or folded against the face of the leaf 6*a* as seen in Figure 1. The other leg 7*c* of the arm 7 is bent to an L-shape to provide a hook-like end or locking element 7*d* which may be interengaged with a longitudinally extending edge recess or notched groove 11, of the leaf 6 to hold the leaves in a fixed relationship.

Figure 2:
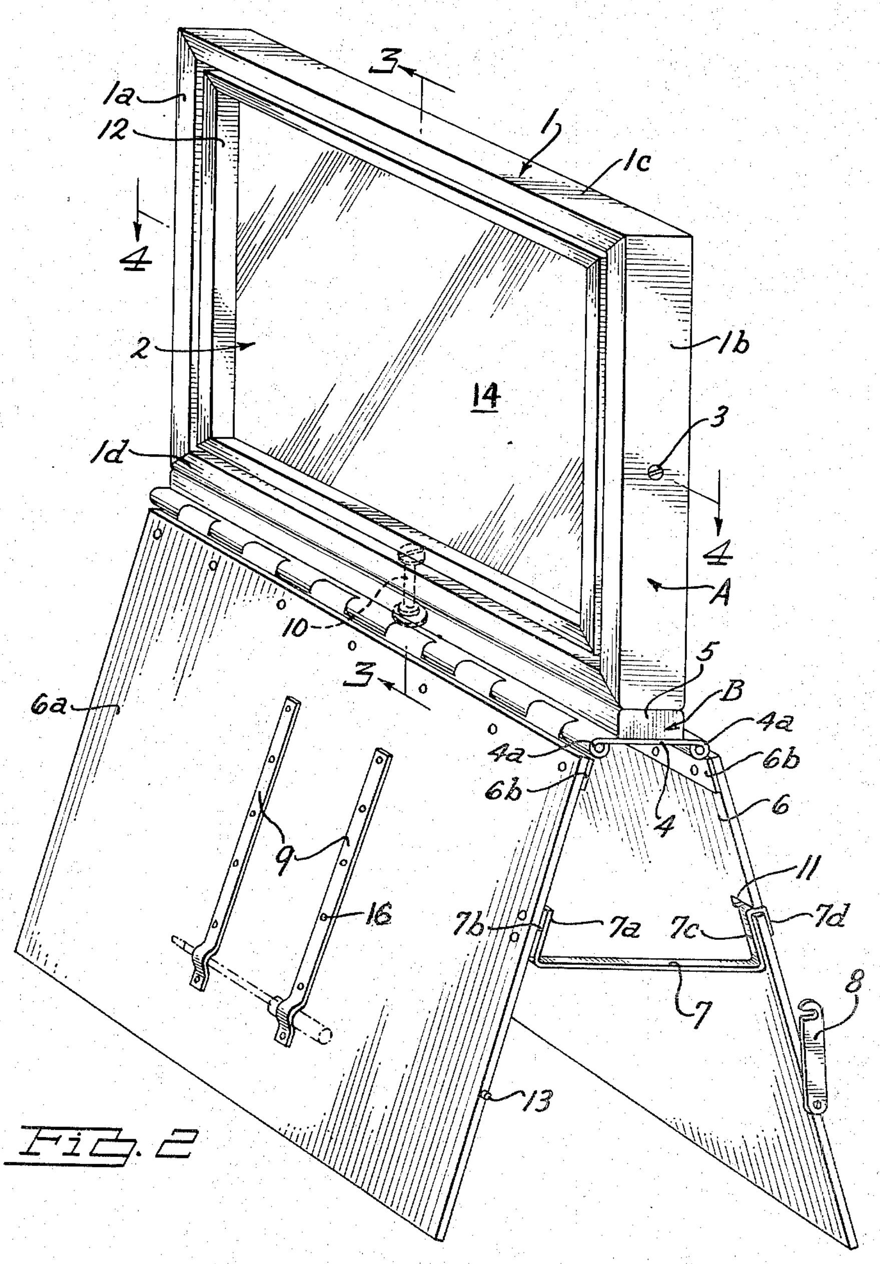
Figure 2 is an elevational view in perspective showing my device in open condition with the case components forming a stand and support for the mirror of such device.

The leaves 6 and 6*a* as will be evident from Figure 1 are of sufficient size to match in their closed position the peripheral edges of the mirror supporting frame 1 thus enabling these leaves to fully protect the mirror from damage in transit.

To hold the leaves 6 and 6*a* in closed position when the mirror is not in use I preferably provide a latch or lever 8 at each of the lower outer ends of the leaf 6 (see Figure 2) which as seen in Figure 1 are adapted to swing into engagement with pins 13 to hold the leaves 6 and 6*a* in abutting relationship to the supporting frame 1 when the device is collapsed for carrying.

Figures 3, 4:
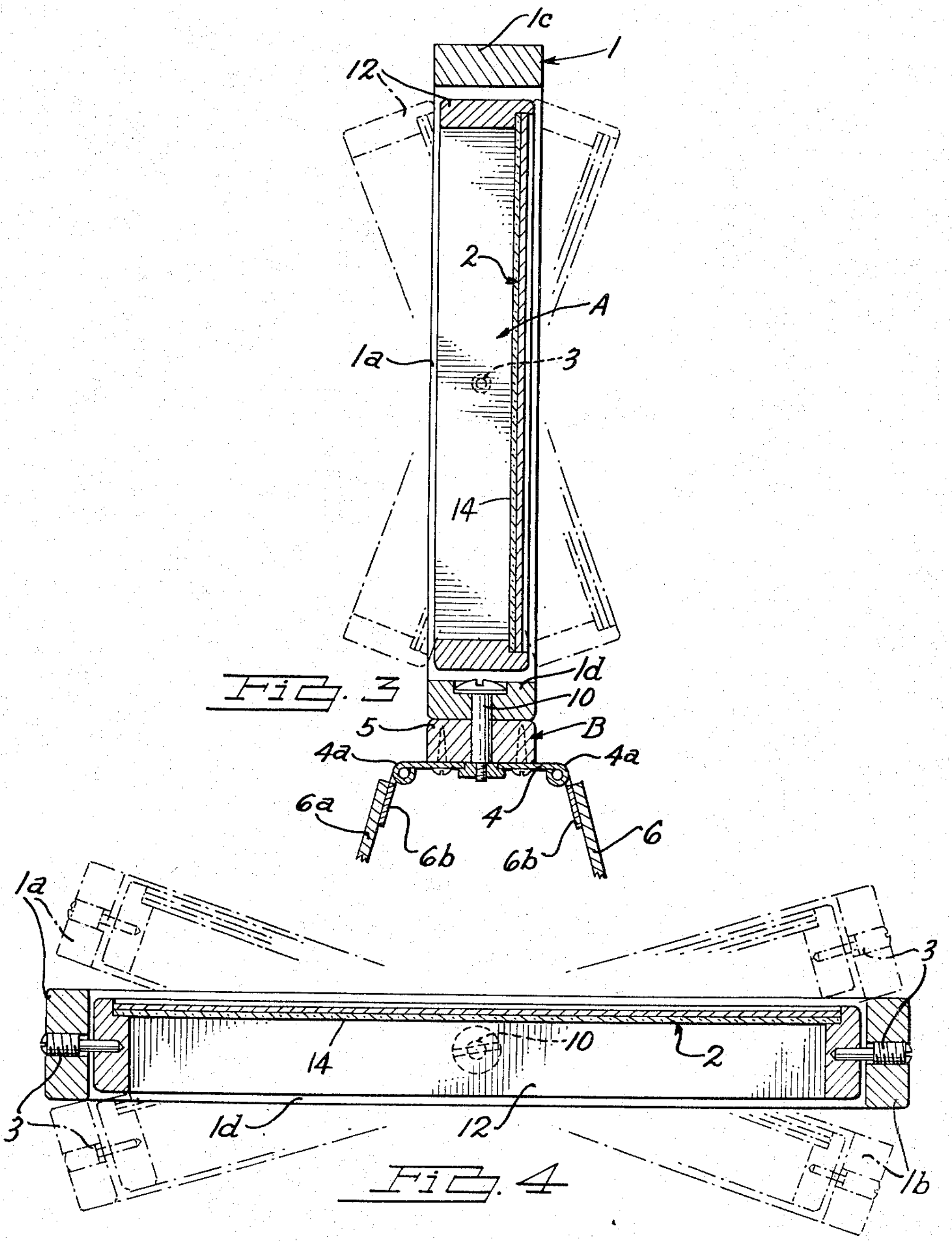
Figure 3 is a cross sectional elevation taken at 3—3 of Figure 2 and showing several positions of the mirror means in phantom.
Figure 4 is a cross sectional plan view taken at 4—4 of Figure 2, this view also showing several positions of the mirror means in phantom.

It will be observed from Figures 2, 3, and 4 that the face of the mirror 14 is set back from the frontal face of the frame 12 so as to form a depression between the inner face of the leaf 6*a* and the face of the mirror in which to store diagrams and tools. In this connection I provide as seen in Figure 2 a plurality of elastic strips 9 separated a suitable distance preferably approximately four inches apart and fastened to the leaf 6 by suitable small brads 16. Sufficient distance is maintained between brads to permit insertion under the elastic strips 9 of the aforesaid diagrams and small adjusting tools. A separate tool kit is therefore unnecessary.

In operation of the servicing device of my invention the case-forming leaves 6 and 6a are released by unfastening the latches 8 from the pins 13 and permitting the leaves 6 and 6a to fall of their own accord to a vertical position in which they are fastened in a secure position by the supporting arm 7 to form the base or stand for the mirror structure A. Thereafter, after positioning the device in front of the television screen, the mirror means 2 is adjusted to the proper angular position for conveying an image of the screen of the set being tested to the technician. Thus the mirror means 2 may be given a lateral adjustment by swinging the supporting frame 1 through a horizontal plane about the pivot 10 on the swivel portion 5 of the base B while the latter remains stationary. Moreover to secure a vertical tilt adjustment of the mirror means 2 it may be swung or turned through a vertical plane on the pivot screws 3 while the frame support 1 and base B remain stationary. Thus by proper adjustment of the mirror means 2 through the available structure any angular relationship of the mirror to the screen is possible.

The device may be constructed in almost any size without hindering its function and may be suitably made of wood, metal such as aluminum or plastic.

From the foregoing description of my invention it will be evident that I have provided a novel and universally adjustable service mirror and a combination stand and protective case therefore well adapted for servicing requirements in the field of television and other fields in which similar problems are encountered. It will be understood that various changes and modifications may be made by those skilled in the art in the specific structure disclosed without departing from the spirit or intent of my invention. Accordingly all such changes, modifications and equivalent structures coming within the scope of the appended claims are contemplated.

I claim:

1. A mirror device for use in television servicing comprising an elongated base member, a pair of plate-like legs hingedly mounted relative to said base member lengthwise thereof, a mirror support pivotally mounted on said base member intermediate its length for pivotal movement about a generally vertical axis and a mirror pivotally mounted on said mirror support for pivotal movement about a generally horizontal axis, said plate-like legs in one position thereof serving as a stand for said mirror support and mirror and in a second position serving with said mirror support as a protective closure for said mirror.

2. A mirror device for use in television servicing comprising a base including an elongated central member having opposite lateral edges and a pair of plate-like leaves hinged to said lateral edges; a mirror support pivotally mounted on said central member for pivotal movement about a vertical axis generally central of said central member and a mirror pivotally mounted on said support for pivotal movement about a generally horizontal axis above said central member; said mirror having opposite faces and said leaves being adapted to be swung down away from said mirror to constitute legs of a stand for said mirror or to be swung upwardly toward said mirror to substantially cover the opposite faces of said mirror.

3. A mirror device for use in television servicing comprising a base including a central member and a pair of plate-like leaves hinged to said central member; a mirror; and means including a frame-like member pivotally mounting said mirror to said base for pivotal movement in a horizontal plane and in a vertical plane, said leaves being adapted to be swung into abutting relationship with said frame-like member to provide therewith a substantially closed casing for said mirror and being adapted to be swung downwardly to provide a stand for said mirror and its said mounting means.

4. A mirror device for use in television servicing comprising a base including a central member and a pair of plate-like leaves hinged thereto; a mirror support; generally vertical pivot means between said central member and said mirror support providing for pivotal movement of said mirror support relative to said base in a generally horizontal plane; mirror means; and generally horizontal pivot means between said mirror means and said mirror support providing for pivotal movement of said mirror means relative to said support in a generally vertical plane; said leaves of said base being movable to an open stance position beneath said central member to effect therewith a stand for said mirror support and a mirror means and being further movable to a position in juxtaposition to said mirror means to provide a protective covering means for said mirror means.

5. A mirror device for use in television servicing comprising a mirror, a holding frame for said mirror, a supporting frame for said holding frame, means pivotally mounting said holding frame on said supporting frame for pivotal movement about a generally horizontal axis, a collapsible stand for said supporting frame including a pair of hinged plate-like legs and means pivotally mounting said supporting frame on said stand for pivotal movement about a generally vertical axis, said plate-like legs being swingable into abutment with said supporting frame to encase said mirror.

6. A mirror device for use in television servicing comprising in combination a mirror casing and stand including, a frame-like member having opposite faces, mirror means pivotally mounted within said frame-like member for tilting movement relative thereto in a horizontal plane, a central member pivotally mounting said frame-like member for pivotal movement relative thereto in a vertical plane, and a pair of covers hingedly secured to said central member in spaced and substantially parallel relationship, said covers being positionable in abutment with the opposite faces of said frame-like member to provide therewith a substantially closed casing for said mirror means and being positionable below said frame-like member at an angle to each other to provide with said central member a stand for said mirror means, and releasable means for holding said covers in predetermined position relative to said central member.

7. A mirror device as claimed in claim 6 including locking means for releasably holding said cover means in abutting relationship with said frame-like member.

8. A mirror device for use in television servicing comprising a base including a central member and a pair of plate-like leaves hinged thereto; a mirror; means including a frame-like member pivotally mounting said mirror to said base for pivotal movement about a generally horizontal axis and about a generally vertical axis; said leaves being adapted to be swung into abutting relationship with said frame-like member to provide therewith a case for said mirror and being adapted to be swung downwardly whereby said base provides a stand for said mirror and its said mounting means and locking means releasably associated with said leaves for holding said leaves in a substantially fixed relationship relative to said central member.

References Cited in the file of this patent

UNITED STATES PATENTS

| Number | Name | Date |
|---|---|---|
| 1,135,428 | Belber | Apr. 13, 1915 |
| 1,499,361 | Freund | July 1, 1924 |
| 1,667,564 | Pearson | Apr. 24, 1928 |
| 1,860,694 | Shields | May 31, 1932 |
| 1,999,476 | Pollock | Apr. 30, 1935 |
| 2,067,602 | Dorfman | Jan. 12, 1937 |
| 2,582,593 | Kramer | Jan. 15, 1952 |